May 26, 1936.  J. C. LITTLE  2,042,232
DIGGING MACHINE FOR ROOT CROPS
Filed Jan. 18, 1935
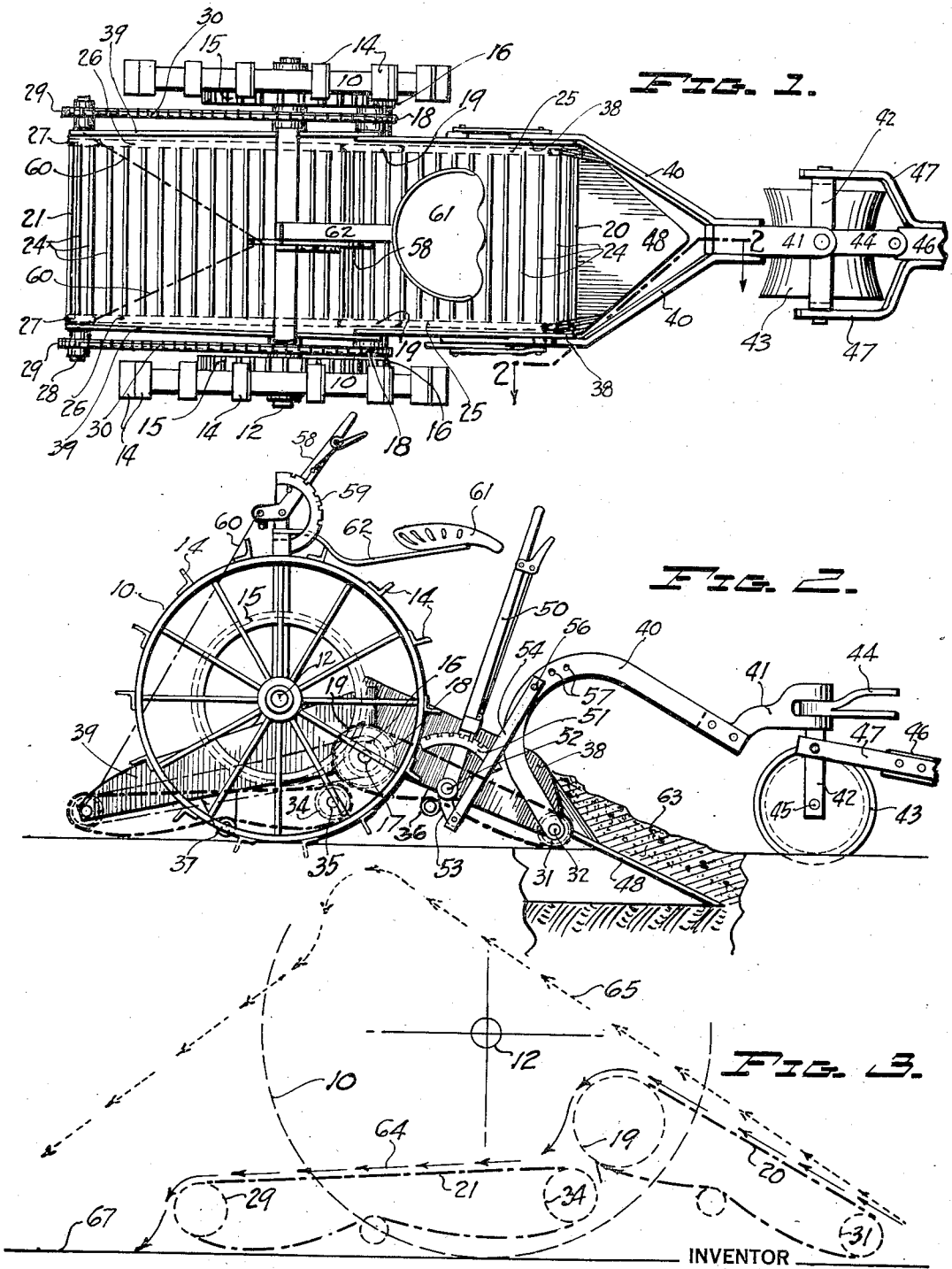
INVENTOR
J. C. LITTLE,
BY
ATTORNEY Patented May 26, 1936

2,042,232

UNITED STATES PATENT OFFICE 2,042,232

DIGGING MACHINE FOR ROOT CROPS

Jesse C. Little, Morgan, Utah

Application January 18, 1935, Serial No. 2,320

3 Claims. (Cl. 55—51)

This invention relates to a digging machine for root crops, such as potatoes and the like.

The principal objects of my invention are to provide an implement embodying improvements which shall:

First. Effect a substantial saving in power.

Second. Reduce to a minimum, mechanical injury to potatoes or other root crops in the handling thereof during the process of digging.

Third. Be simpler and less expensive to manufacture than implements for a like purpose, as heretofore constructed.

Implements known as "potato diggers" of different kinds, have been on the market for a considerable number of years, and are in rather extensive use. Such diggers, while varying somewhat in details of construction, include in general, two traction wheels spaced axially apart from each other, and having a digger blade disposed some distance in advance of the traction wheels. In all types of diggers of which I am aware, a so-called conveyor web is located at the rear of the digger blade, and as heretofore constructed, is inclined upward and back, so as to carry the potatoes over the axis of the traction wheels.

After being carried over the axis of the wheels, the potatoes are discharged at a point considerably above, and back, of the traction wheel axis. From this point the potatoes drop onto a second conveyor web which slopes towards the ground, in most cases rather abruptly. Both these conveyor webs are driven from a shaft located at the discharge end of the first conveyor web, this shaft being suitably intergeared with the traction wheels.

The conveyor webs consist usually of iron bars about ⅜ inch and ₁₆ inch in diameter, and spaced apart from one another a suitable distance so that the earth may be shaken away from the potatoes while the potatoes themselves are carried back, and are deposited on top of the ground. These conveyor webs require considerable power to drive them, and under average conditions, each potato digger requires six large horses to perform the digging operation.

Such an excessive consumption of power, I have observed is due to the unnecessarily long conveyor webs, and to the relatively high point to which the potatoes and much of the accompanying earth, must be lifted. The long travel and drop of the conveyor webs results in mechanical injury to the potatoes, such injury being especially noticeable with varieties that have tender skins and are crisp in texture.

In my improved machine, I place the drive shaft for the conveyor webs a considerable distance below the horizontal plane of the traction wheel axis, as well as a considerable distance in front of this axis. This shortens the two conveyor webs materially, as well as reduces the elevation to which the potatoes must be lifted, since the point of discharge of the first conveyor web allows the potatoes to pass in front of, and under, the traction wheel axle, while the second conveyor web, which receives the potatoes from the first one, is located very close to the ground, and has little slope.

Thus, by means of my invention, the potatoes or other roots, are discharged by the second conveyor web immediately back of the traction wheels, and are deposited on the ground with only a slight drop. In the existing types of machines, on the contrary, the potatoes are bumped down over the rather steep slope of the second conveyor, and dropped off far behind the traction wheels with considerable force, which, together with the long travel, results in excessive mechanical injury. By "mechanical injury" is meant bruising the potatoes and/or splitting them to such an extent that they are not salable in the higher grades, but, if disposed of at all, must be classed as "culls".

The features of my invention for which the protection of Letters Patent of the United States is desired, are collectively grouped in the claims concluding this specification.

In the drawing,

Fig. 1 represents the plan of my improved digging implement;

Fig. 2, a side elevation thereof, with the blade in the digging position, showing the ground in front of the blade, in section along line 2—2 in Fig. 1; and Fig. 3, a diagram showing more clearly the relative disposition of the conveyor webs.

Referring to the drawing, the numeral 10 denotes the usual traction wheels mounted on an axle 12, and provided with traction cleats 14. Rigidly mounted with respect to the traction wheels, are the driving gears 15, as usual. Meshing with the driving gears are the pinions 16, these being rigidly mounted on the shaft 17, which also carries, rigidly mounted thereon, the sprocket wheels 18, and the conveyor wheels 19.

The conveyor system of the implement consists preferably of a front conveyor web 20 and a rear conveyor web 21, these webs being preferably made of transverse bars 24, spaced apart from one another and having their ends flexibly interlocked with conveyor chains 25 and 26, respectively. The conveyor web 20 extends around and is driven by the conveyor wheels 19, while the other conveyor web 21 extends around conveyor drive wheels 27 rigidly mounted on shaft 28, the latter carrying rigidly mounted sprocket wheels 29 driven by sprocket chains 30, the latter in turn, extending around the drive sprockets 18.

At the other end of the conveyor web 20, are idler wheels 31 carried on the shaft 32, and at the other end of the conveyor web 21, are idler wheels 34 carried on a shaft 35, the slack or return strand of the respective webs being supported on idlers 36 and 37. The conveyor web 20 operates between two side walls 38, and the conveyor web 21, between two side walls 39, all of these side walls forming part of the framework of the digger.

The draft gear at the forward part of the implement, may consist of a yoke 40 having its lower end pivoted on the shaft 32, and its upper and front end fastened to a draft head 41. The latter has swiveled within it, a fork 42 extending down on either side of a grooved pilot wheel 43 to engage an axle 45. The present drawing shows a horse-drawn implement, and therefore, the draft bar 41 may be provided with a clevis 44 to which the usual doubletree (not shown) may be attached. The tongue 46, which is indicated in the unhitched position, may be pivotally connected to the fork 42, by means of a pair of yoke members 47.

A digging blade 48 projects forward from the frame 38 and is preferably rigid therewith, being positioned so as to operate immediately in the rear of the pilot wheel 43. The draft yoke 40 may be adjustably held in certain rigid positions with respect to the frame, by means of a ratchet lever 50 which is rigidly mounted on a shaft 52. This lever may be engaged by a notched quadrant 51, and shaft 52 may carry short arms 53, which latter are pivoted to connecting straps 54 whose other ends may be adjustably pinned, for example at 56, to the draft yoke 40.

Any desired plurality of holes, such as those indicated at 57, may be provided to receive the pin 56 for various adjustments, in order to regulate the depth to which the digging blade may be set. By means of the lever 50, the digging yoke 40 may be swung backward or forward in relation to the frame 38, thereby varying the position of the digging blade from the maximum depth, through different degrees, to a point where it is lifted entirely out of the ground for the purpose of idling the implement when going to and from the field. This operation of course, lifts the conveying web 20 simultaneously with the digging blade.

The conveyor web 21 may be lifted, when idling, by means of a ratchet lever 58 engaging a quadrant 59, and connected by rods or chains 60, to any suitable point of the frame 39.

In using this implement, the operator may occupy a seat 61, supported on a spring blade 62 which is attached to the framework. By manipulating the lever 50, the digging blade 48 may be brought, for instance, into the position indicated in Fig. 2, and the machine in moving forward along a row of potatoes or other roots, digs up a strip of earth, as indicated at 63.

The strip of earth is moved back over the blade and is caught by the upper strand of the conveyor web 20, and conveyed backwardly over the bars 24, where the earth is shaken through the spaces between the bars, leaving the roots on top of the conveyor strand, from where they are discharged onto the conveyor web 21, and finally rolled off over the shaft 27 at the rear of the machine.

In order to fully apprehend the advantages secured in my present invention, it is desirable to compare its operatively new performance with the performances of machines for a similar purpose, as heretofore constructed. I am fully aware that minor details of construction in my machine are not substantially different from those in machines which have long been sold in the open market, but I may particularly state that the novelty of my improved machine consists in locating the entire conveyor web system entirely below the horizontal plane which coincides with the rotative axis of the traction wheels, and that this system is driven from a point a considerable distance forward from the drive axle, so that the conveyor web 20 discharges its load entirely below, and in front of, the drive axle. Thus, the other conveyor web 21 may be brought down very low close to the ground, and its inclination be made very slight, thus causing the potatoes to be thoroughly cleaned in a comparatively short travel, and the final drop to the ground to be negligible.

The travel over the upper strands of the conveyor web system in my machine, is only about one-half of what it is in potato diggers as heretofore constructed, which aids in reducing the mechanical injury to potatoes, to almost nothing.

Added to these advantages is the fact that the strip of earth which passes over the digger blade, together with the roots contained in the strip, need be elevated only to a nominal height, that is to say, to points considerably below the level of the axle 14. This results in a great saving in horsepower, due to the reduced lift of the load and to the reduced friction of the shortened conveyor web.

In order to give a definite basis of comparison, I may state that in all diggers including my own, the traction wheels ordinarily are of approximately the same diameter, and the machines are of approximately the same capacity, but from tests actually made in the field, side by side with my machine, and therefore under the same general conditions, a standard machine of a type largely used, required six large horses to pull the machine, and at the end of the day, the horses were thoroughly tired out, whereas my improved machine required only four horses, and at the end of the day, these were only normally fatigued.

Comparing the operative results of the two machines in a particular case when harvesting the same variety of potatoes, the mechanical injury in the case of the standard machines was almost thirty per cent, while in the case of my improved machine, mechanical injury was practically zero. The diagram in Fig. 3 indicates the conveyor web system of my improved potato digger, and by means of the full-line arrows 64, shows the path taken by the potatoes. At the same time, the dotted arrows 65 show the path taken by the potatoes in standard machines hereinbefore referred to.

It is to be understood that all machines, including my own, are provided with means for agitating the conveyor webs under the potatoes for the purpose of shaking off the adhering earthy material. Since such agitating means form no part of my invention, and are besides old and well known, they need not be illustrated here.

Having fully described my invention, what I claim is:

1. A root digging machine, including in combination, a pair of traction wheels having an axle, a digger blade in advance of said traction wheels, and a conveyor web system extending from the rear of the digger blade to a point immediately in the rear of said traction wheels, the said conveyor web system being located entirely below the rotative axis of the said traction wheels and having its greatest elevation in advance of the said rotative axis.

2. A root digging machine, including in combination, a pair of rotatable traction wheels spaced laterally apart from each other, a digger blade in advance of the traction wheels, a conveyor web extending from the rear of the digger blade to a point below the level, and ahead of, the rotative axis of the traction wheels, and a second conveyor web below the discharge of the first conveyor web, the second conveyor web having its discharge immediately to the rear of the traction wheels and close to the ground.

3. A root digging machine, including in combination, a pair of traction wheels having an axle, a digging blade in advance of the axle, and a conveyor-web system disposed entirely below the level of said axle, said conveyor-web system extending back from the said digger blade to a suitable point of discharge but having its greatest elevation in advance of the axle, and means for driving the conveyor-web system due to the rotation of the traction wheels.

JESSE C. LITTLE.